(12) United States Patent
Yu

(10) Patent No.: US 7,900,582 B2
(45) Date of Patent: Mar. 8, 2011

(54) AQUARIUM

(76) Inventor: Bingyan Yu, Guangdong Province (CN)

( * ) Notice: Subject to any disclaimer, the term of this patent is extended or adjusted under 35 U.S.C. 154(b) by 83 days.

(21) Appl. No.: 12/298,521

(22) PCT Filed: Jan. 26, 2007

(86) PCT No.: PCT/CN2007/000295
§ 371 (c)(1),
(2), (4) Date: Jan. 12, 2009

(87) PCT Pub. No.: WO2007/121644
PCT Pub. Date: Nov. 1, 2007

(65) Prior Publication Data
US 2009/0107411 A1    Apr. 30, 2009

(30) Foreign Application Priority Data

Apr. 25, 2006    (CN) .......................... 2006 1 0035307
May 6, 2006    (CN) ....................... 2006 2 0058775 U

(51) Int. Cl.
*A01K 63/00*    (2006.01)
(52) U.S. Cl. ...................................................... 119/265
(58) Field of Classification Search .......... 119/245–247, 119/253, 265–267, 269; 210/167.21, 167.23–167.24; 43/55, 56, 43/54.1; 220/810–813, FOR. 192, FOR. 195
See application file for complete search history.

(56) References Cited

U.S. PATENT DOCUMENTS

| | | | | |
|---|---|---|---|---|
| 2,323,093 A | * | 6/1943 | Levin | 220/812 |
| 2,338,477 A | * | 1/1944 | Wolters et al. | 220/812 |
| 2,532,830 A | * | 12/1950 | Barnhart et al. | 52/66 |
| 2,758,744 A | * | 8/1956 | Spindler et al. | 220/812 |
| 2,792,144 A | * | 5/1957 | Mayer | 220/6 |
| 3,807,356 A | | 4/1974 | Pratt | |
| 3,857,366 A | * | 12/1974 | Willinger | 119/266 |
| 3,961,723 A | * | 6/1976 | Eckel | 220/812 |
| 4,320,852 A | * | 3/1982 | Nagelkirk | 220/812 |

(Continued)

FOREIGN PATENT DOCUMENTS

GB    2266044 A    10/1993

(Continued)

OTHER PUBLICATIONS

Wang, Jing, PCT/CN2007/000295 International Search Report, dated May 24, 2007, 6 pages, to be published by USPTO.

*Primary Examiner* — Rob Swiatek
*Assistant Examiner* — Ebony Evans
(74) *Attorney, Agent, or Firm* — Fish & Richardson P.C.

(57) ABSTRACT

Techniques and apparatus are disclosed for providing an aquarium. An aquarium includes a body that includes a rear wall. The aquarium body is shaped to form an opening at one end. The aquarium also includes an enclosure movably disposed over the opening of the body. The aquarium includes a connection device to connect the enclosure to the body and allow the enclosure to slide over the opening of the body so as to open and close the opening of the body. The connection device includes a support component that includes a vertical fitting component to mount to the rear wall of the body. The support component includes a shaft component disposed at one end of the vertical fitting part. The connection component includes a guide rail attached to the cover to slidably receive the shaft component so as to slide and rotate the cover with respect to the body.

13 Claims, 13 Drawing Sheets

U.S. PATENT DOCUMENTS 5,050,335 A * 9/1991 Hisey .................................. 43/55
6,364,154 B2 4/2002 Kruzick et al.

FOREIGN PATENT DOCUMENTS

| | | | |
|---|---|---|---|
| JP | 7251774 A | 10/1995 |
| JP | 7291039 A | 11/1995 |
| JP | 11127726 A | 5/1999 |
| JP | 2003118467 A | 4/2003 |
| JP | 2005068937 A | 3/2005 |
| JP | 2005080589 A | 3/2005 |

* cited by examiner

AQUARIUM

CLAIM OF PRIORITY

This application is a 371 application of and claims priority to International Patent Application No. PCT/CN2007/000295, filed on Jan. 26, 2007, which claims priority to Chinese Patent Application No. 200610035307.0, filed on Apr. 25, 2006, and Chinese Patent Application No. 200620058775.5, filed on May 6, 2006. The contents of the prior applications are considered part of and are incorporated by reference in the instant application.

BACKGROUND

This application relates to an aquarium for housing living organisms.

An aquarium can be used to host living organisms including fishes, turtles, corals and plants such as float grasses. Aquariums may include a lamp positioned on top of the lamp to enhance an appearance of an aquarium. For example, a lamp assembly may simply be mounted on a top portion of the aquarium in such a manner that base parts of both ends of the lamp assembly are fitted with edges of a body of the aquarium.

SUMMARY

Techniques and apparatus are disclosed for providing an aquarium. An aquarium can be implemented to include a cover that can slide along a body of the aquarium and/or rotate with respect to the body of the aquarium so as to open and close a top opening of the body of the aquarium.

In one aspect, an aquarium includes a body that includes a rear wall. The aquarium body is shaped to form an opening at one end. The aquarium also includes an enclosure movably disposed over the opening of the body. The aquarium includes a connection device to connect the enclosure to the body and allow the enclosure to slide over the opening of the body so as to open and close the opening of the body. The connection device includes a support component that includes a vertical fitting component to mount to the rear wall of the body. The support component includes a shaft component disposed at one end of the vertical fitting part. The connection component includes a guide rail attached to the cover to slidably receive the shaft component so as to slide and rotate the cover with respect to the body.

Implementations can optionally include one or more of the following features. The guide rail can be shaped to form a slide groove with a T-shaped cross-section that opens downward and toward the opening of the body. The support component can include a horizontal fitting component that extends horizontally from one end of the vertical fitting component. Also, the shaft component can be disposed at a position where the horizontal fitting component and the vertical fitting component are connected with each other. A width of one end of the slide groove can be greater than a length of the shaft component. A width of another end of the slide groove can be greater than a size of the horizontal and vertical fitting component in an axial direction of the shaft component and is less than the length of the shaft component, so that the shaft component engages the slide groove and the guide rail slides on the shaft component. The aquarium can also include a bended portion formed at an end of the horizontal fitting component, and the bended portion can be disposed parallel to the vertical fitting part so as to mount the support component to an edge of the rear wall of the body and near the opening of the body. The aquarium can include two of the support and two of the guide rail. The aquarium can include an edge of the cover formed in a step-wise shape including an upper step portion and a lower step portion. The upper step portion can project forward more than the lower step portion so that the upper step portion is flush with an edge of the body and the lower step portion abuts against an inside surface of a front wall of the body when the cover closes the opening of the body. The aquarium can also include a stop component attached at or near a front end of the guide rail so that the stop component limits movement of the guide rail when the cover hangs from an outside surface of the rear wall of the body in an upright state.

Implementations can optionally include one or more of the following features. The aquarium can include a turning-engaging member disposed at a rear end of the guide rail. The turning-engaging member can include a protrusion formed at a bottom surface of the turning-engaging member, and an arc recess formed on both lateral sides of the protrusion and a front side of the protrusion so as to be fitted with the shaft component of the support. The shaft component of the support can be formed with a concave portion to be fitted with the turning-engaging member. When the shaft component of the support component is fitted in the arc recess, the protrusion can be fitted in the concave portion so that the cover can pivot around the shaft component with respect to the body. The aquarium can also include a frame attached on an edge near the opening of the body. The support component can be mounted to a rear edge of the frame, and the frame can be shaped to form a port in a side portion of the frame. The frame can be shaped to form the port to receive at least one of a pipe and an electrical cable. The aquarium can include a supporting rod disposed at an internal top portion of a side wall of the frame so as to support the cover when opened at a predetermined angle.

The techniques and apparatus described in this specification can potentially provide one or more of the following advantages. The cover of the aquarium can be opened simply and in various manners so that a user can select one of the various manners depending upon different operations. For example, the top opening can be partially opened by the cover. Also, the top opening can be completely opened by the cover. Further, the top opening can be opened by sliding the cover translationally with respect to the body. The top opening can be opened by turning the cover. In addition, the top opening can be opened by firstly sliding the cover and then sliding the cover in an inclinational way whiling truing the cover; or the top opening is opened by firstly truing the cover and then sliding the cover in an inclinational way whiling truing the cover.

By providing these and other operational modes of the cover, it is convenient to clean the inside of the body, to carry out repairing inside the body, and to throw feed into the body in such a manner that the cover is not necessarily separated from the body. In addition, damage to a connection part can be avoided when the cover is accidentally closed or turned due to impact to the cover.

BRIEF DESCRIPTION OF THE DRAWINGS

Like reference symbols and designations in the various drawings indicate like elements.

DETAILED DESCRIPTION

An aquarium may include a lamp positioned on top of the lamp to enhance an appearance of an aquarium. For example, a lamp assembly may simply be mounted on a top portion of the aquarium in such a manner that base parts of both ends of the lamp assembly are fitted with edges of a body of the aquarium. The lamp assembly may fall into the aquarium by mistake during installation and usage. Because the lamp assembly is electrically connected, the fallen lamp assembly may pose an electrical hazard.

To prevent such dangers, an aquarium may incorporate a lamp assembly with a cover. The lamp assembly can be disposed at an internal top portion of the cover and the cover is connected with a rear wall of a body of the aquarium. The cover can be opened and closed by turning the cover upwards and downwards, and can also be fixed, by pulling rods or supporting rods, in a state in which the cover is opened at a predetermined angle. With the configuration, the aquarium can be operated simply and the cover can be opened easily.

However, for example, when an article is taken out from a bottom of the aquarium, or a filter part of a compartment for filtering disposed at the rear wall of the body is cleaned, it may be necessary for the cover to be opened at an angle as large as possible. Since the cover is heavy due to the lamp assembly disposed therein for example, the cover tends to fall forwards or rearwards so that the pulling rods or the supporting rods and connection parts are damaged.

In addition, with the above configuration, it may be troublesome to open and fix the cover. Furthermore, the opening angle of the cover is limited. As a result, it is inconvenient to clean and replace the filter part.

The techniques and apparatus described in this application can be used to provide an aquarium. An aquarium can be implemented to include a cover that can slide along a body of the aquarium and/or rotate with respect to the body of the aquarium so as to easily open and close a top opening of the body of the aquarium.

Figure 1:
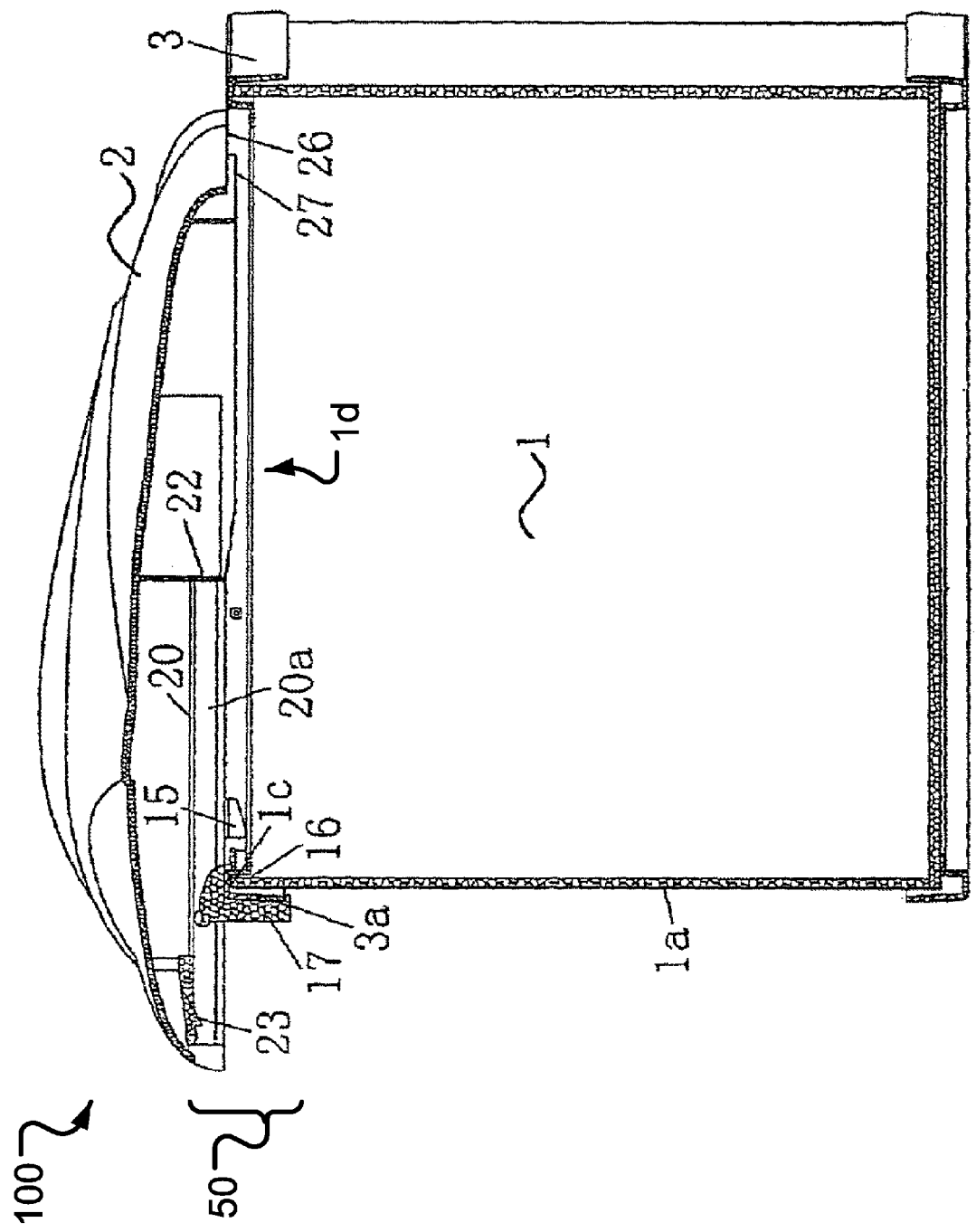
FIG. 1 shows an example structure of an aquarium.

FIGS. 1-6 show different views of an example aquarium 100. FIG. 1 shows a side view of an aquarium 100 that includes a body 1, an enclosure or cover 2, and at least one connection device 50 to connect the body 1 to the cover 2. The body 1 includes a rear wall 1a and a top portion 1d.

Figure 2:
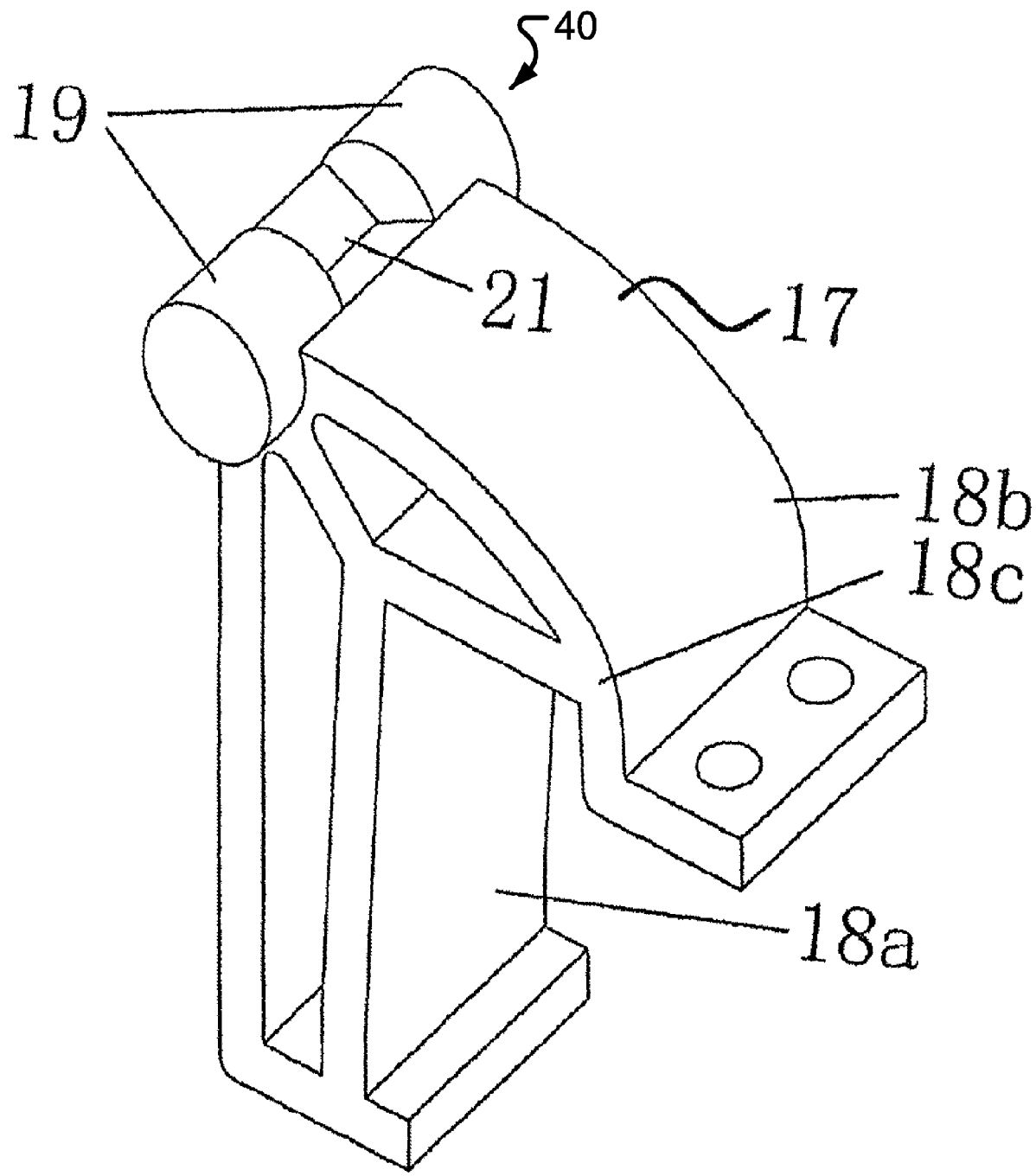
FIG. 2 shows an example structure of a support for an aquarium.
Figure 4:
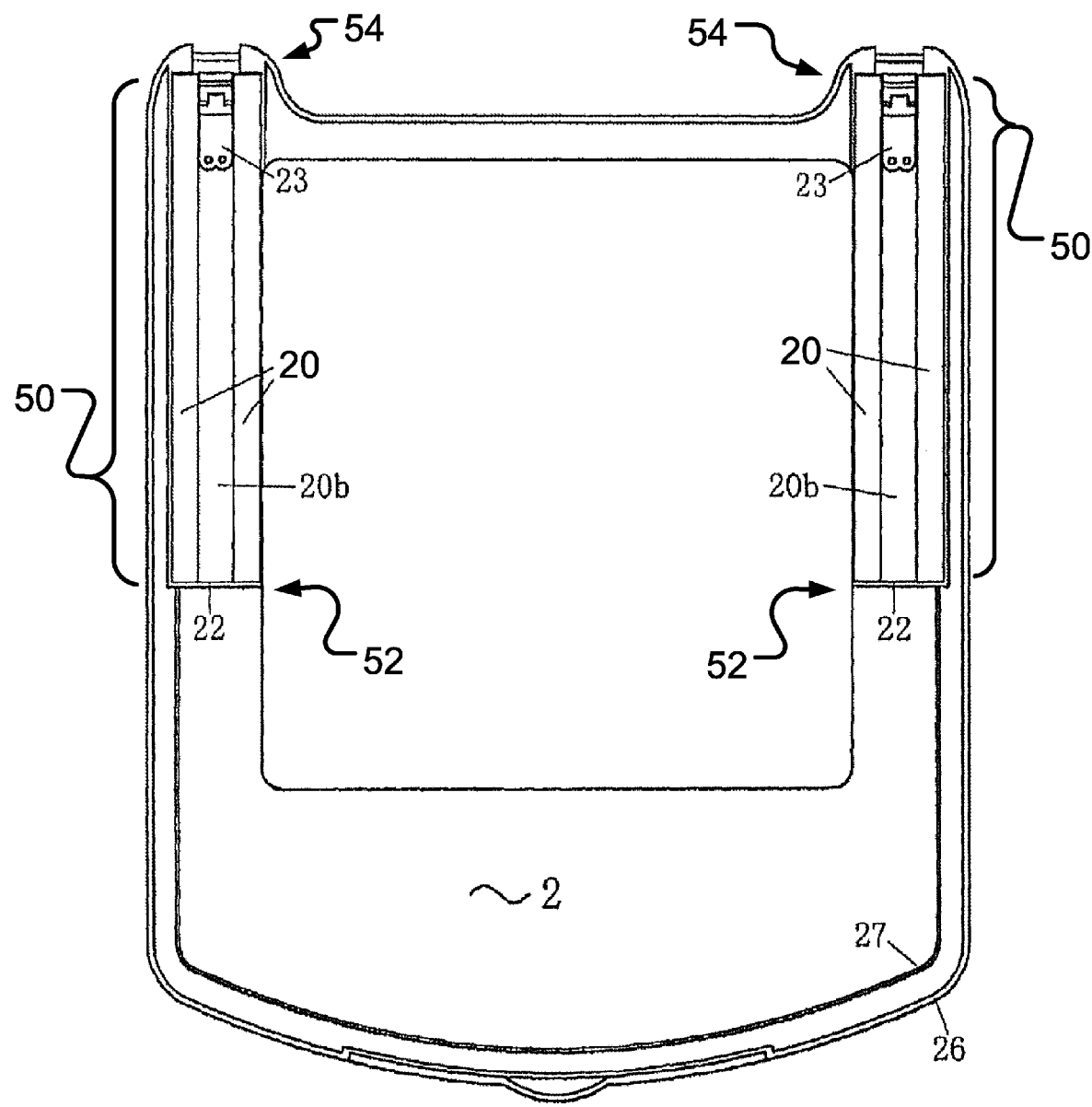
FIG. 4 shows an example structure of an internal top surface of the over of an aquarium.

Referring to FIGS. 2 and 4, the connection device 50 includes a support component 17 and a guide rail 20. FIG. 2 shows an example structure of a support component for an aquarium. The support component 17 includes a vertical fitting part 18a that can be mounted to the rear wall 1a of the body 1, a horizontal fitting part 18b extending substantially horizontally from a top end 40 (i.e., an upper end shown in FIG. 2) of the vertical fitting part 18a, and a shaft part 19 disposed at the top end 40 of the vertical fitting part 18a. Specifically, the shaft part 19 is disposed at a position where the horizontal fitting part 18b and the vertical fitting part 18a are connected with each other.

FIG. 4 shows an example structure of an internal top surface of an enclosure or cover of an aquarium. The guide rail 20 is fixed to an internal top portion of the cover 2. The shaft part 19 of the support 17 component (as shown in FIG. 2) is designed to slidably engage the guide rail 20 so as to enable the cover 2 to rotate and slide with respect to the body 1.

Figure 5:
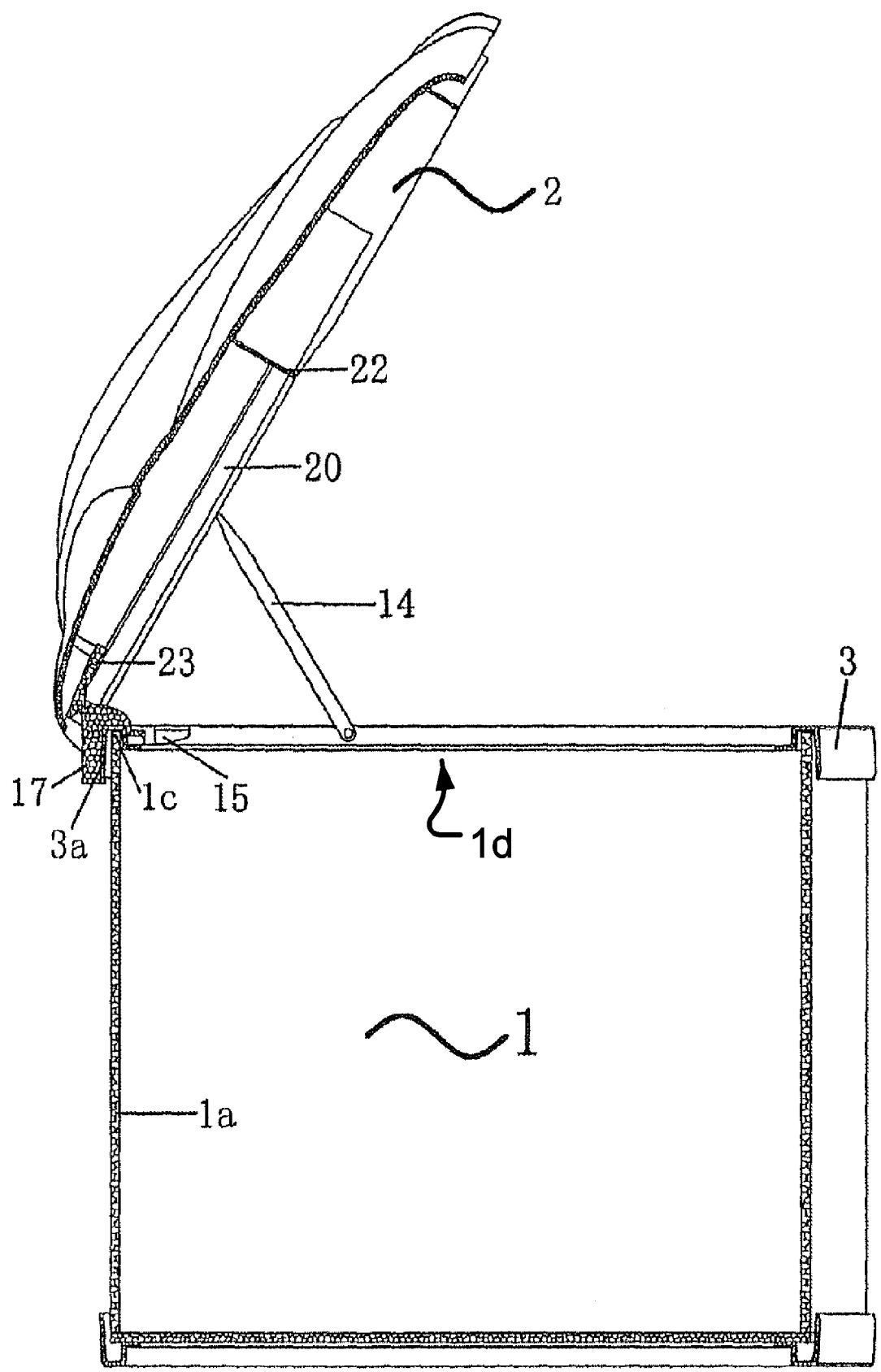
FIG. 5 shows an example structure of an aquarium in one state.
Figure 6:
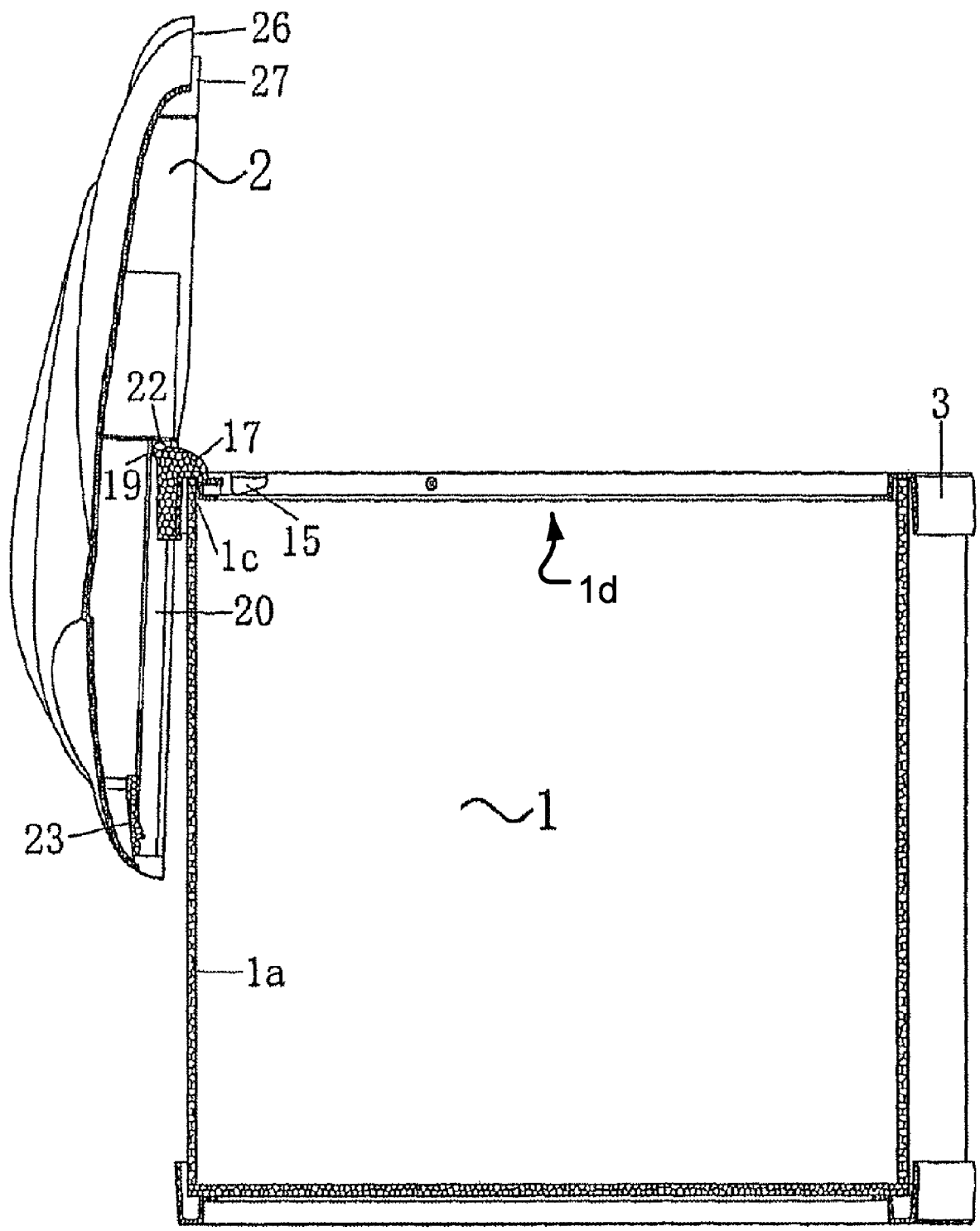
FIG. 6 shows an example aquarium in another state.

Referring back to FIG. 2, the support component 17 includes a bended portion 18c is formed at an end of the horizontal fitting part 18b. The bended portion 18c extends downwards parallel to the vertical fitting part 18a so as to mount the support component 17 to an upper edge 1c of the rear wall 1a of the body 1 easily, as shown in FIGS. 1, 5, and 6. FIG. 5 shows an example structure of an aquarium in one state with the cover 2 of the aquarium 100 turned upwards around a shaft part of the support 17 and supported at a predetermined angle using a supporting rod. FIG. 6 shows an example aquarium in another state with the cover 2 of the aquarium 100 located against an outside of a rear wall 1a of the body in an upright position.

As shown in FIG. 4, a pair of connection devices 50 can be implemented to provide two sets of the support 17 and the guide rail 20. Each guide rail 20 includes a slide groove 20a. The slide groove 20a has a cross-section of a substantial T shape and is open downwards. In some implementations, the slide groove 20a has a V-shaped, L-shaped, or I-shaped cross-section, or a cross-section of any other appropriate shape. A width of an upper portion of the slide groove 20a is greater than an axial length of the shaft part 19, and a width (i.e., an opening width of 20b shown in FIG. 4) of a lower portion of the slide groove 20a is greater than a size of the horizontal and vertical fitting parts 18b and 18a in an axial direction of the shaft part 19 and is less than the length of the shaft part 19, so that the shaft part 19 can be engaged in the slide groove 20a and the guide rail 20 can slide on the shaft part 19. These structures can prevent the shaft part 19 from escaping out of the slide groove 20a.

The connection device 50 also includes a stop component 22 provided at a front end 52 of the guide rail 20. The stop component 22 can limit the sliding of the shaft part 19 in the guide rail 20 so that the shaft part 19 can not escape out of the slide groove 20a.

Figure 3:
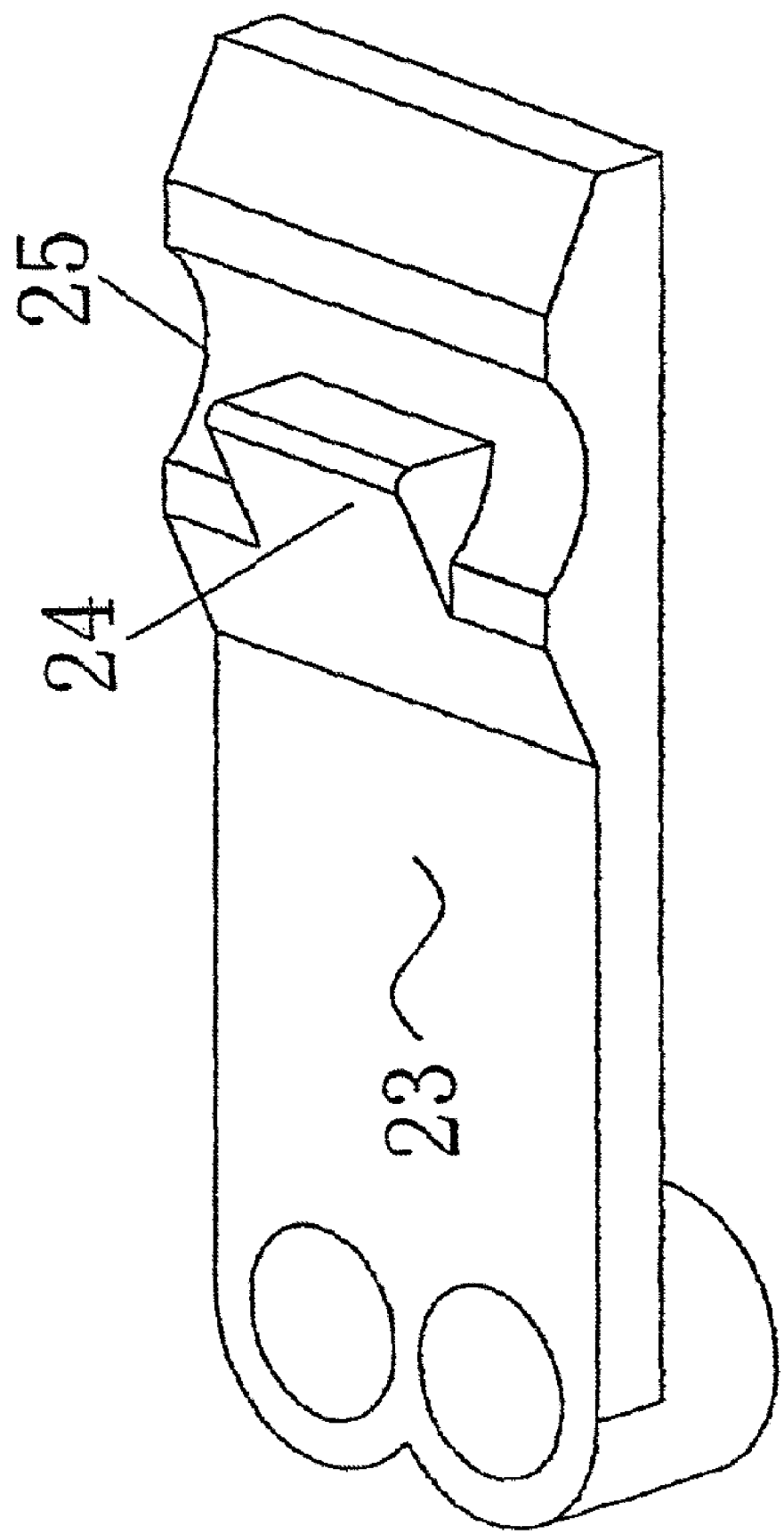
FIG. 3 shows an example structure of a turning-engaging member of an aquarium.

FIG. 3 shows an example structure of a turning-engaging member of an aquarium. As shown in FIG. 4, the turning-engaging member 23 is disposed at a rear end 54 of the guide rail 20. Referring back to FIG. 3, a protrusion 24 is formed at the bottom surface of the turning-engaging member 23. Also, an arc recess 25 is formed on both lateral sides of the protrusion 24 and a rear side of the protrusion so as to be fitted with the shaft part 19 of the support 17 as shown in FIG. 2. Accordingly, the shaft part 19 of the support 17 is formed with a concave portion 21 to be fitted with the turning-engaging member 23. When the shaft part 19 of the support 17 is fitted in the arc recess 25, the protrusion 24 is fitted in the concave portion 21 so that the cover 2 can pivot around the shaft part 19 with respect to the body 1 as shown in FIG. 5.

As shown in FIGS. 1, 5 and 6, the aquarium 100 can also include a frame 3 mounted on an edge 1c of a top 1d of the body 1. A notch or through hole 15 is formed in a side portion of the frame 3 so that an inside of the body 1 is accessible from an outside of the body. For example, a water tube, an air tube, and an electrical wire can be connected to corresponding parts inside the body through the notch or through hole 15.

The support component 17 is mounted to a rear edge 3a (as shown in FIG. 1) of the frame 3. In some implementations, the frame 3 is not necessary, and the support 17 is directly mounted to the upper edge 1c of the rear wall 1a of the body 1 as shown in FIGS. 1, 5, and 6.

The aquarium 100 can also include a supporting rod 14 disposed at an internal top portion of a side wall of the frame 3 to support the cover 2 in an open state at a predetermined angle as shown in FIG. 5.

Referring to FIGS. 1 and 6, a front edge of the cover 2 is formed in a step shape including an upper step portion 26 and a lower step portion 27. The upper step portion 26 projects forwards more than the lower step portion 27 so that the upper step portion 26 flushes with a front edge of the body 1 and the lower step portion 27 abuts against an inside surface of a front wall of the body 1 so as to restrain the cover 2 from further protruding forwards beyond the body 1.

An example operation of the aquarium as described in this specification is provided as follows. In use, when the front edge of the cover 2 is flushed with the front edge of the body, the cover can not further move forward because the lower step portion 27 abuts against the inside surface of the front wall of the body 1. When the cover 2 is pushed rearwards, the guide rail 20 can move along the support 17 so that the cover 2 is translated with respect to the body 1 until a top face of the body 1 can be opened while the cover 2 is stably kept above the body 1.

When the cover 2 is further moved rearwards, the cover 2 can incline downwards, due to the downward pull of the weight of a rear potion of the cover 2, under the supporting action of the support component 17. Also, a front end of the cover 2 can be raised upwards. This is shown in FIG. 6. Subsequently, the guide 20 slides downwards in an inclinational manner on the shaft part 19 and gradually approaches the outside of the rear wall 1a of the body 1. When the stop component 22 at the front end of the guide rail 20 comes into contact with the shaft part 19, the shaft part 19 supports the cover 2 to hang from the outside of the rear wall 1a of the body 1 in an upright state as shown in FIG. 6.

In addition, when the cover 2 is directly turned upwards in a state in which the front edge of the cover 2 is flush with the front edge of the body 1, the protrusion 24 of the turning-engaging member 23 is engaged in the concave portion 21 of the shaft part 19. In addition, the arc recess 25 of the turning-engaging member 23 connected with the cover 2 is fitted with the shaft part 19 to rotate around the shaft part 19 so that the cover 2 can rotate around the shaft part 19 and turn upwards. This allows the cover 2 to be supported at a predetermined angle by the supporting rod 14. For example, FIG. 5 shows the cover 2 in an open state at a predetermined angle.

The aquarium can be closed in an inverse operation order of the operation order of opening of the aquarium. For example, referring to FIG. 6, the upper end of the cover 2 is pushed so as to be horizontally located. The cover 2 is pushed forward until the front edge of the cover 2 is flush with the front edge of the body 1 so that the body 1 is closed. The operation of closing of the aquarium can be easily understood by those skilled in art as shown in FIGS. 1, 5 and 6.

In another aspect, another example aquarium 200 is shown with reference to FIGS. 7-13. For example, referring to FIGS. 7, 8 and 13, the other example of an aquarium 200 includes a body 1, a cover 2, and a connection device. The body 1 has a top opening 1b, that is, a top surface (the upper surface in FIGS. 7, 8 and 13) of the body 1 is opened. The cover 2 is used to open and close the top opening 1b of the body 1. The connecting device is used to connect the cover 2 to the body 1, and allows the cover 2 to slide in a front and back direction (corresponding to the left and right direction in FIG. 8) with respect to the body 1 so as to open and close the top opening 1b of the body 1.

Figure 7:
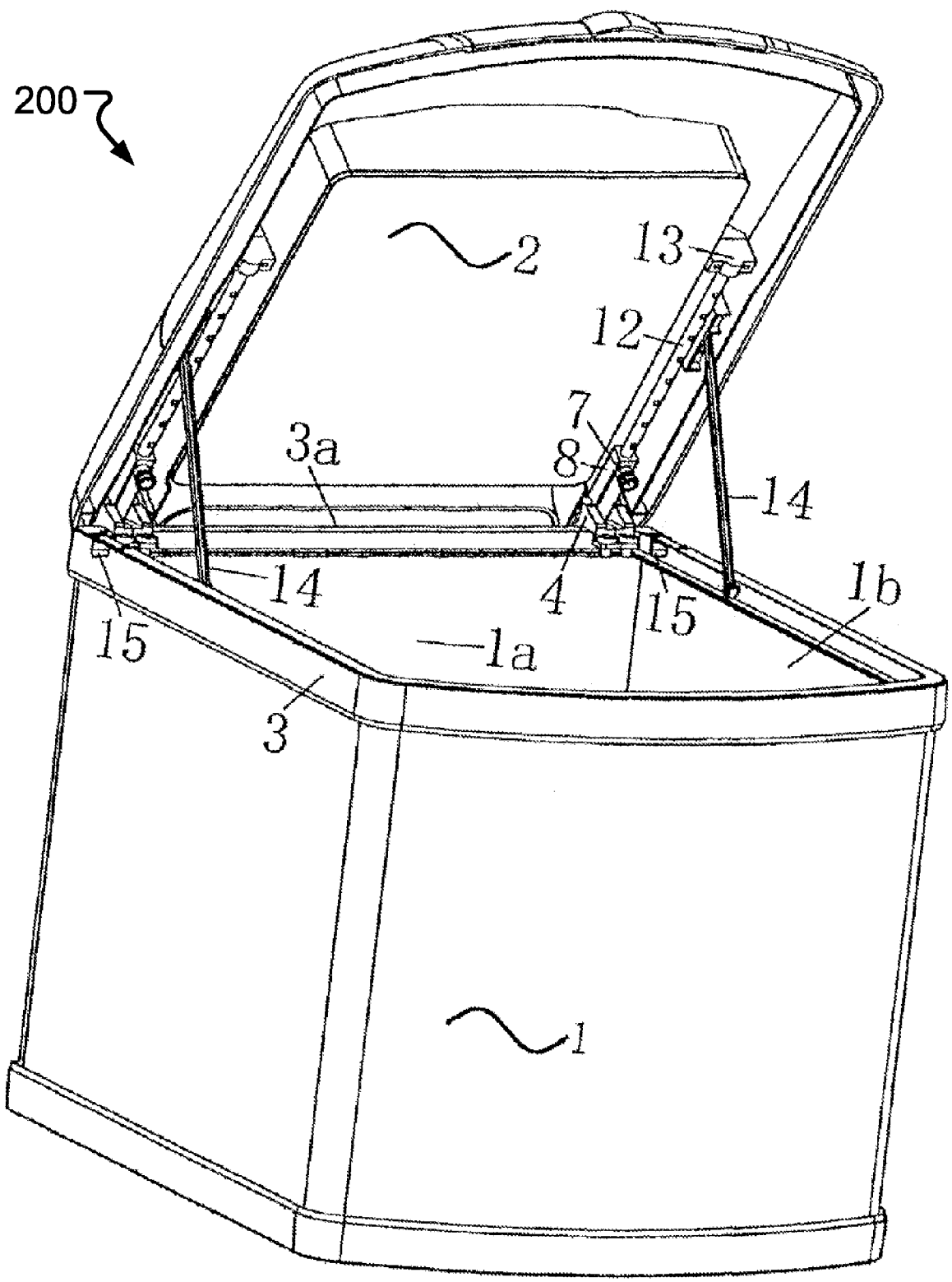
FIG. 7 shows another example structure of an aquarium.
Figure 8:
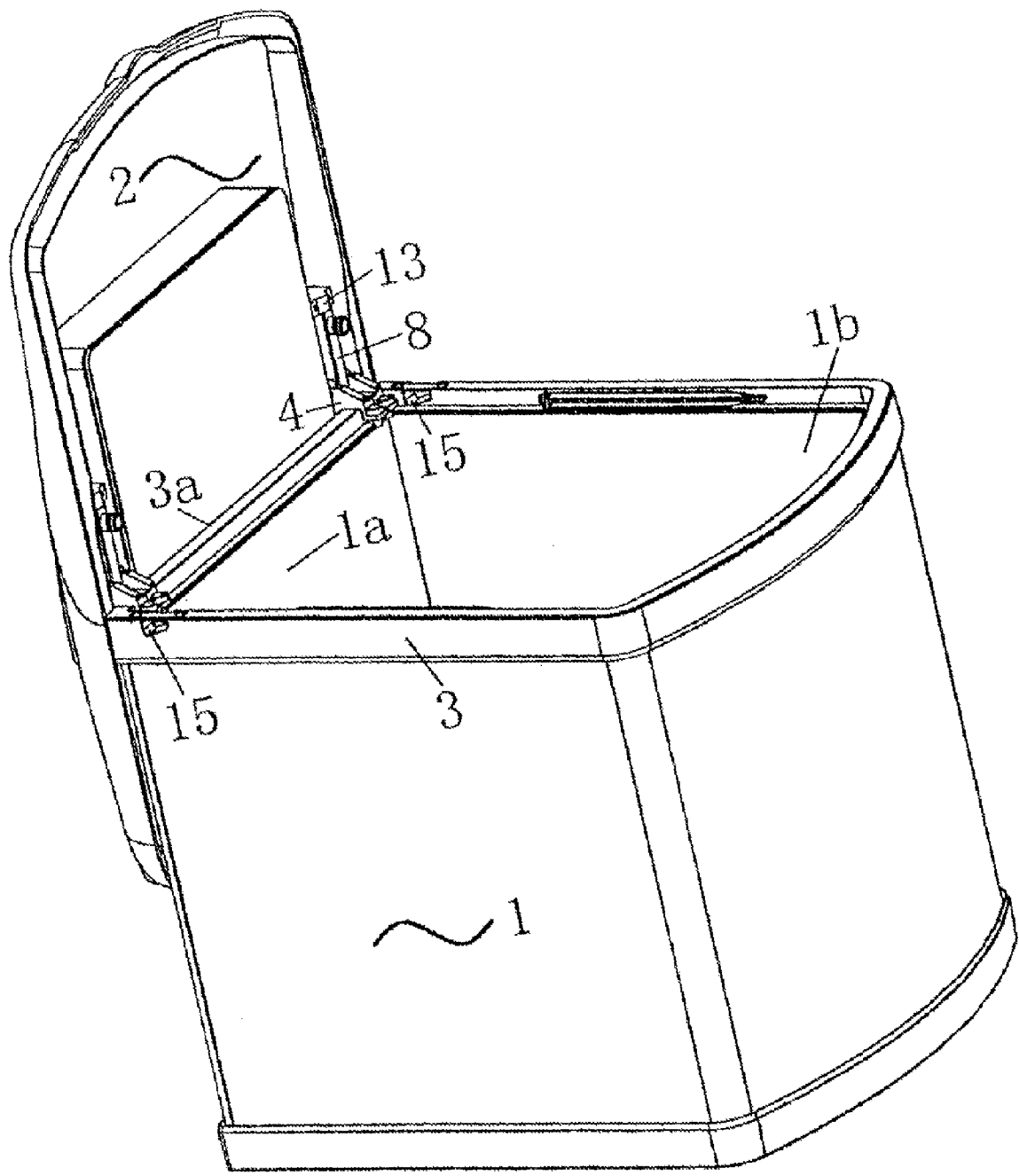
FIG. 8 shows the other example aquarium in one state.
Figure 12:
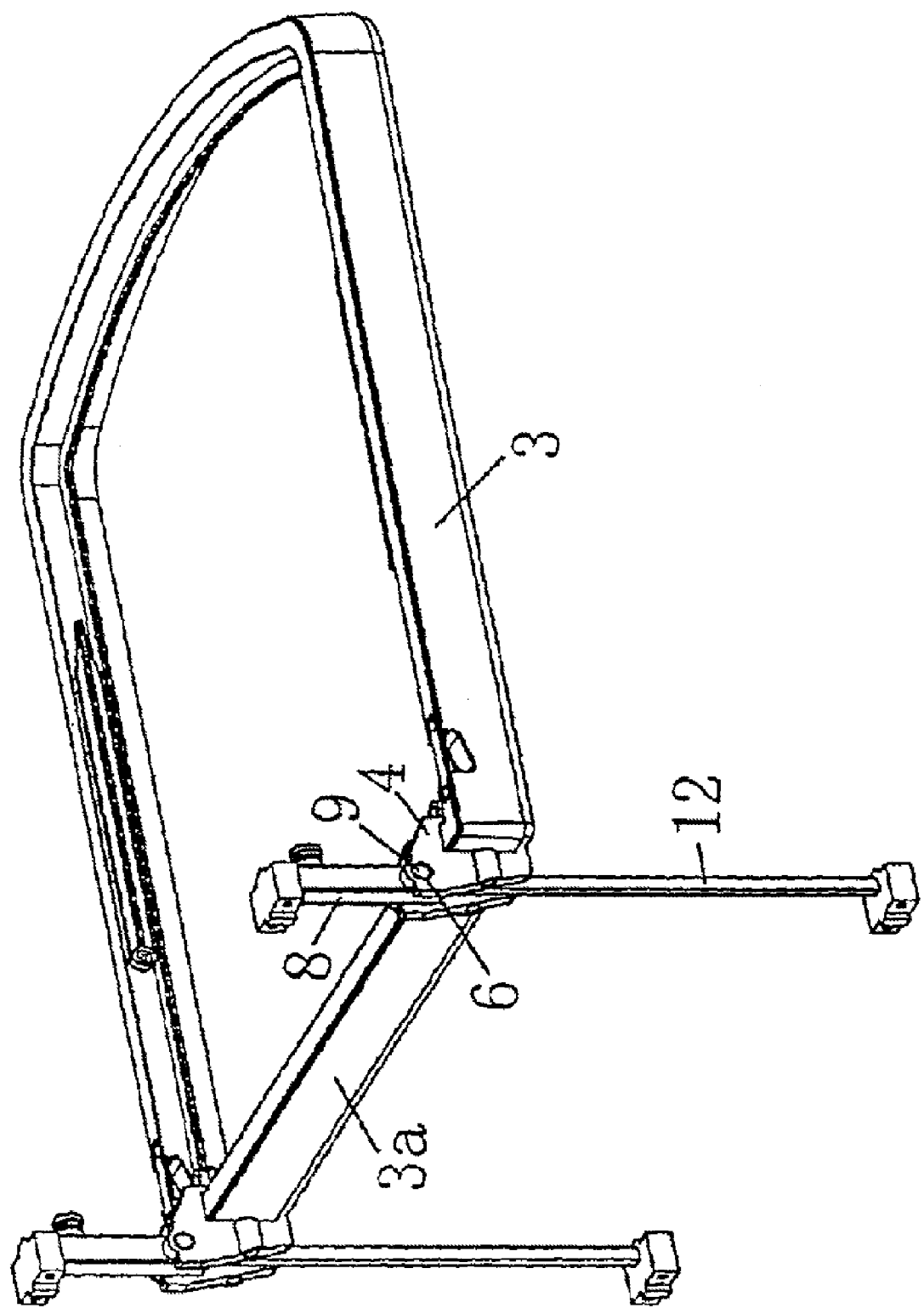
FIG. 12 shows a sliding bushing of the other connecting device.
Figure 13:
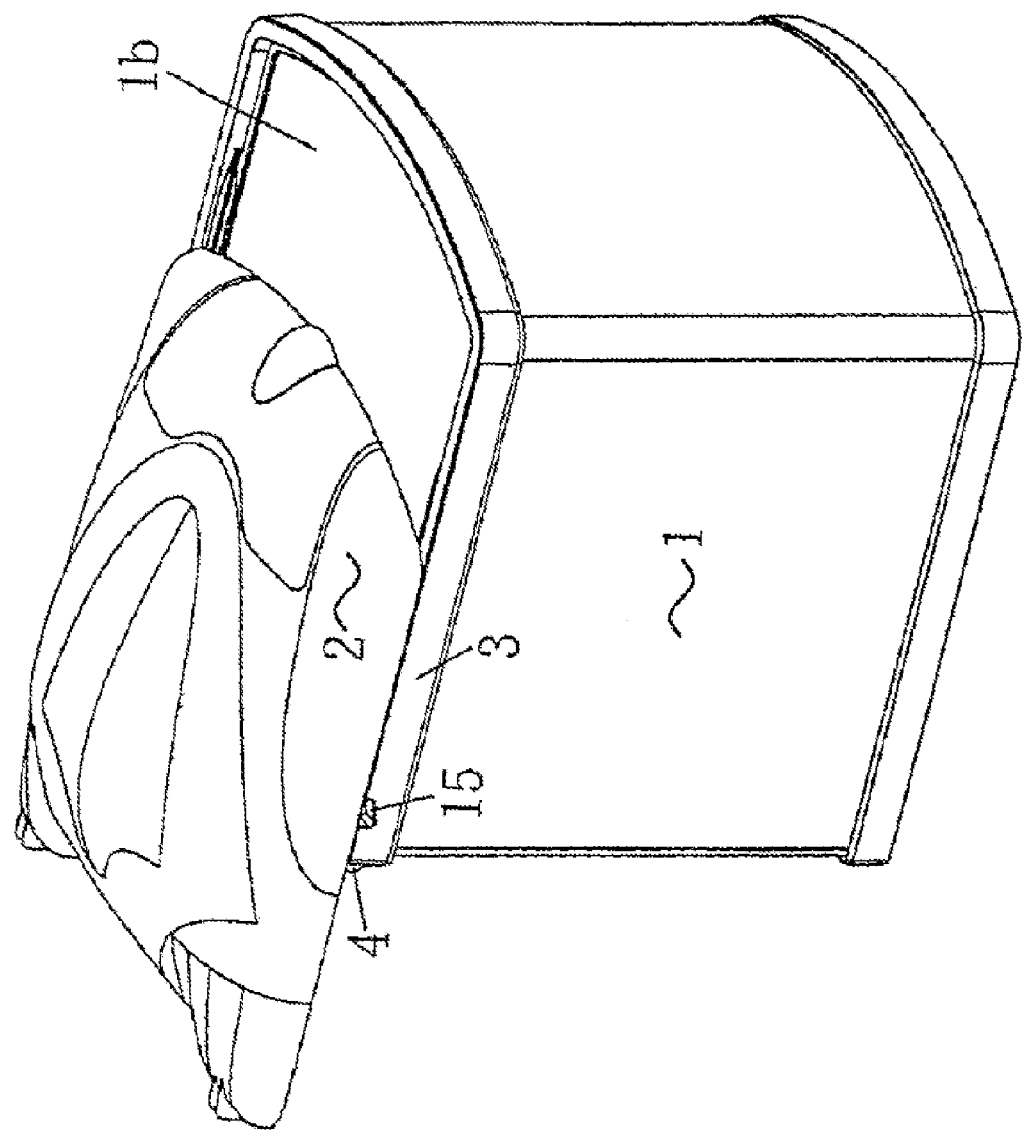
FIG. 13 shows an example process of using the other aquarium.

The connecting device also allows the cover 2 to rotate with respect to the body 1. For example, the cover 2 may turn about a shaft hole 6 (referring to FIGS. 9 and 12) with respect to the body 1, as shown in FIG. 7. Alternatively, the cover 2 first slides backward along the body 1 by a predetermined distance, then turns about the shaft hole 6, and finally abuts against an outer side of a rear wall of the body 1 vertically, as shown in FIGS. 13, 12 and 8.

Specifically, the connecting device includes a mount 4, a sliding bushing 8 and a sliding rod 12. The mount 4 is mounted on an upper edge 1c of a rear wall 1a of the body 1. The sliding rod 12 is mounted on the cover 2, for example, the sliding rod 12 is mounted on the cover 2 by means of a pair of abutments 13. The sliding bushing 8 encloses the sliding rod 12 slidably, and is mounted on the shaft hole 6 of the mount 4 by a rotating shaft 9 so that the sliding bushing 8 may pivot about the shaft hole 6. Accordingly, the cover 2 can pivot about the shaft hole 6 with respect to the body 1 when the sliding bushing 8 drives the sliding rod 12 to pivot about the shaft hole 6 of the mount 4, and at the same time, the cover 2 can slide in the front and back direction with respect to the body 1 when the sliding bushing 8 and the sliding rod 12 slide with respect to each other.

As shown in FIGS. 7, 8 and FIGS. 10, 12, the mount 4, the sliding rod 12 and the sliding bushing 8 are all provided in pair, such that the cover 2 can slide and rotate more smoothly. However, this is provided as an example only and different number of each component can be implemented.

The aquarium 200 can also include a frame 3 mounted on an edge 1c of a top portion of the body 1, and a notch or a through hole 15 is formed in a side portion of the frame 3 to provide access to the inside from the outside of the aquarium 200. For example, a water pipe, an electrical wire or the like may be connected to the inside of the body 1 through the notch or the through hole 15. The mount 4 is mounted on a rear edge 3a of the frame 3 (as shown in FIG. 12). In some implementations, the frame 3 may be not necessary, and the mount 4 is mounted on the upper edge 1c of the rear wall 1a of the body 1 directly.

Figure 9:
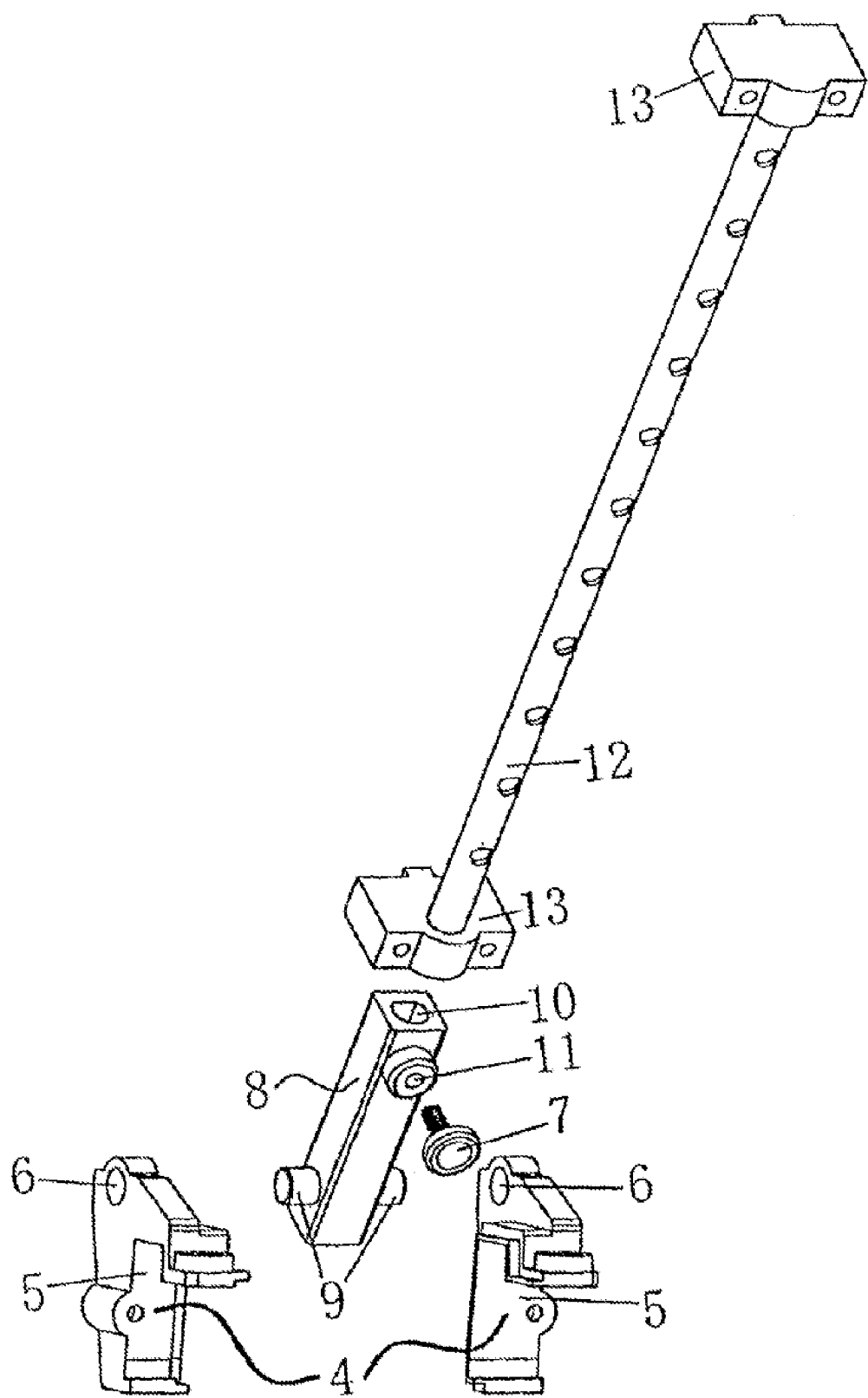
FIG. 9 shows another connecting device of the other aquarium.

FIG. 9 is an exploded perspective view showing an example of a connecting device of the aquarium 200. As shown in FIG. 9, the mount 4 includes two symmetrical separate parts; however, the mount 4 may be formed into one piece. The mount 4 is fixed, through a recess 5, on the rear edge 3c of the frame 3 by means of a screw, or the mount 4 can fixed on the upper edge 1c of the rear wall 1a of the body 1 directly.

The shaft hole 6 is formed in the mount 4, and the rotating shaft fitting with the shaft hole 6 is formed on the sliding bushing 8. The rotating shaft 9 can rotate in the shaft hole 6 so that the sliding bushing 8 can rotate about the rotating shaft 9 with respect to the mount 4.

The sliding bushing 8 is shaped to define a guiding hole 10 extending through the sliding bushing 8 in an axial direction. Also, the sliding rod 12 passes through the guiding hole 10 and can slide therein in the axial direction.

In addition, the sliding bushing 8 is further provided with a screwed hole 11 penetrating the side wall of the sliding bushing 8, for receiving a screw 7, thus the sliding bushing 8 and the sliding rod 12 are fixed relative to each other, that is, the sliding rod 12 is prevented from sliding in the sliding bushing 8. Alternatively, the sliding bushing 8 may be provided with a through hole instead of the screwed hole 11, and correspondingly, the sliding rod 12 is provided with a through hole, thus, the sliding bushing 8 and the sliding rod 12 can be fixed relative to each other with a screw or a pin.

As described above, a pair of abutments 13 is fixed on the ends of the sliding rod 12 respectively. Thus, the sliding rod 12 is fixed on an inner top portion of the cover 2.

Figure 10:
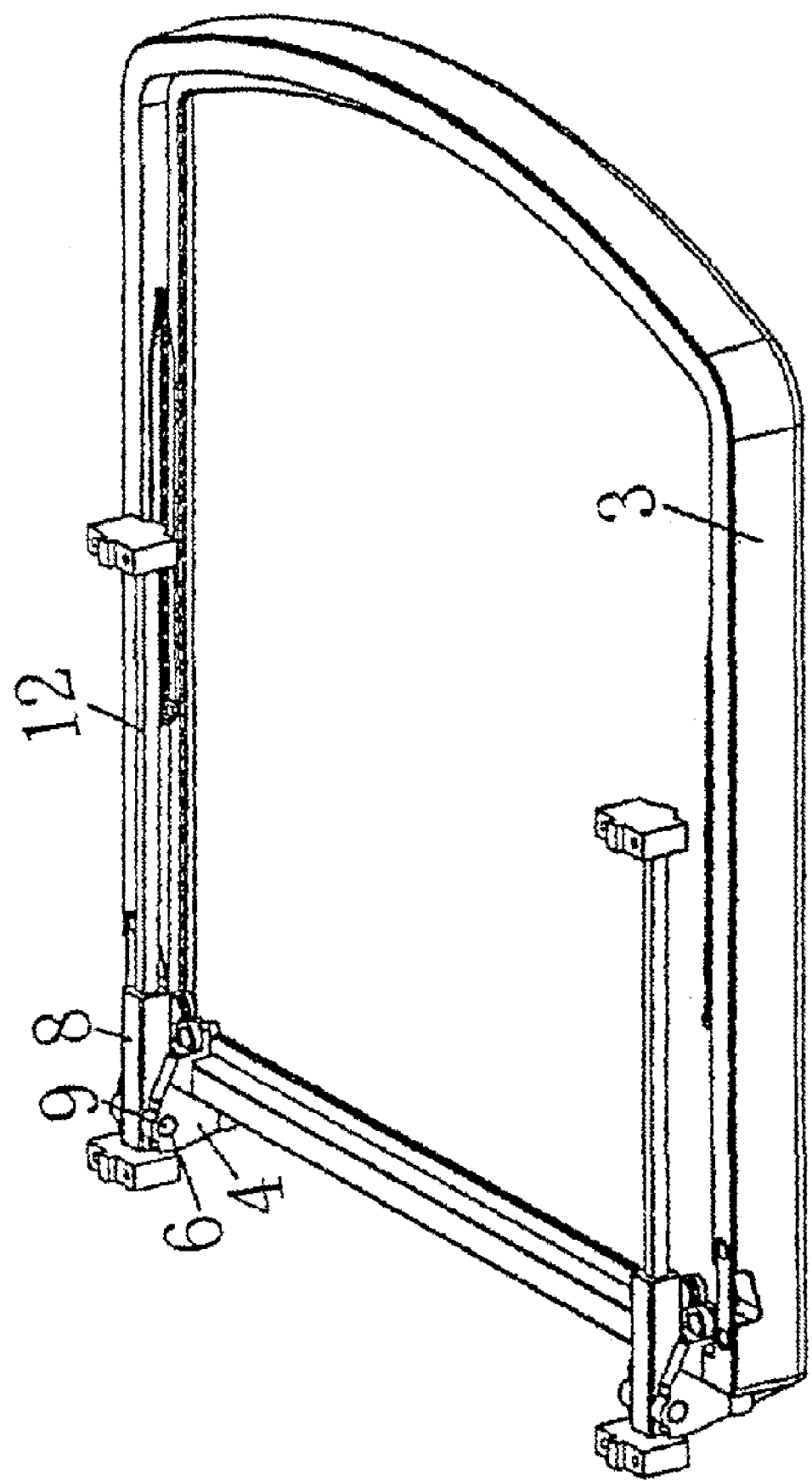
FIG. 10 shows the other connecting device mounted to a frame of the other aquarium.
Figure 11:
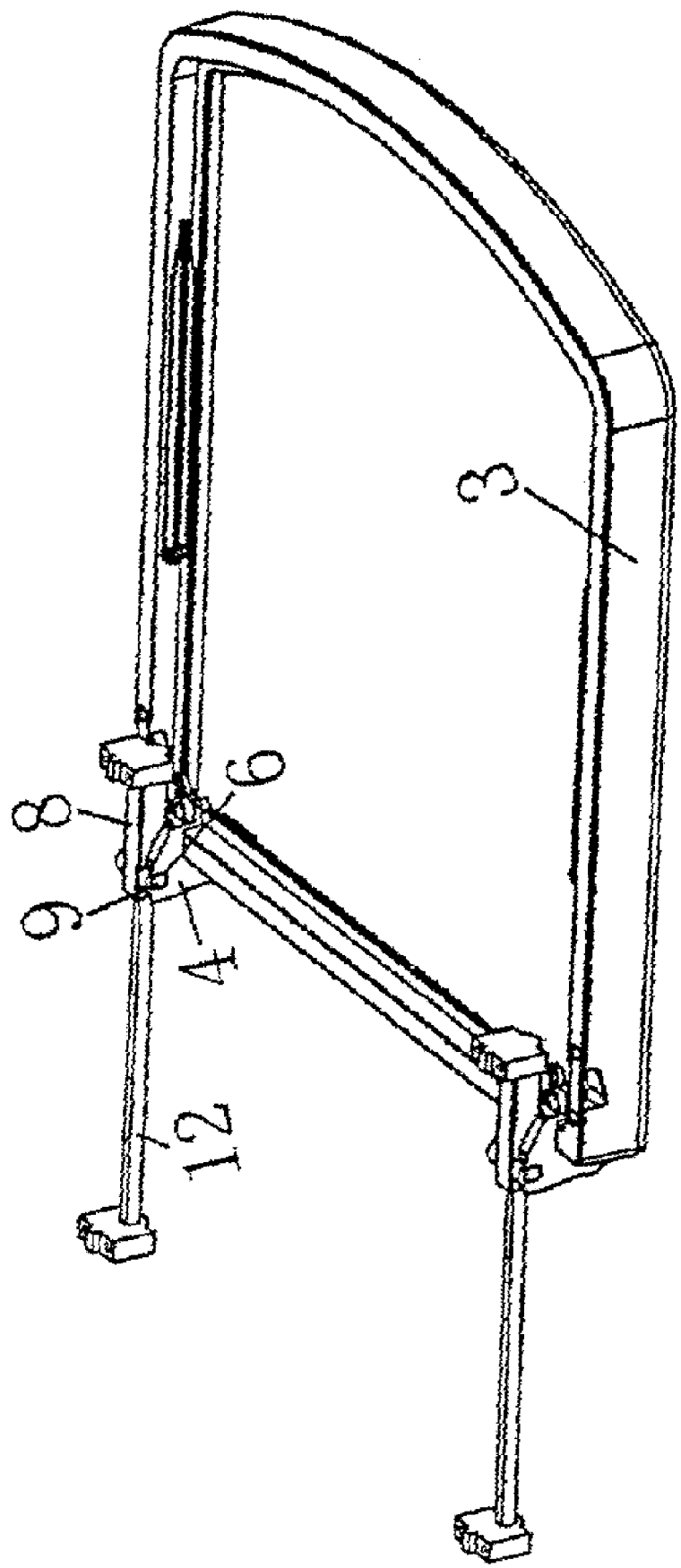
FIG. 11 shows a sliding rod of the other connecting device.

Referring to FIGS. 10 and 11, the mount 4 is fixed on the rear edge 3*a* of the frame 3, the sliding rod 12 passes through the guiding hole 10 of the sliding bushing 8, and the rotating shaft 9 of the sliding bushing 8 is rotatably fitted in the shaft hole 6 of the mount 4. Referring to FIGS. 10 and 11, the sliding rod 12 may move with respect to the frame 3 along the guiding hole 10 of the sliding bushing 8 in the front and back direction. Referring to FIGS. 7 and 8, the sliding rod 12 slides along the guiding hole 10 of the sliding bushing 8 when the frame 3 is mounted on the top portion of the body 1, as shown in FIG. 11. Thus, the sliding rod 12 drives the cover 2 to slide with respect to the body 1 in the front and back direction. At the same time, the sliding bushing 8 may rotate about the shaft hole 6 of the mount 4 by means of the rotating shaft 9, so that the sliding bushing 8 drives the sliding rod 12 and thus the cover 2 together to rotate about the rotating shaft as a pivot into a vertical state. Also, a rear portion of the cover 2 abuts against the outside of the rear wall 1*a* of the body 1.

Referring to FIGS. 7, 8 and 13, the frame 3 is fixed on the top portion of the body 1, thus the mount 4 can be mounted to the body 1 through the frame 3. The sliding rod 12 is fixed on the inner top portion of the cover 2 by the abutments 13 on the ends thereof, and the cover 2 may move in the front and back direction with respect to the body 1 by sliding the sliding rod 12 in the guiding hole 10 of the sliding bushing 8, thus, as shown in FIG. 13, the top opening 1*b* of the body 1 is opened partially.

The aquarium 200 can also include a supporting rod 14. The supporting rod 14 is provided on an inner side of the side wall of the frame 3 so as to support the cover 2 opened at the predetermined angle, as shown in FIG. 7.

An example operation of the aquarium 200 is described as follow. The cover 2 can be opened in various operating modes. For example, at first, the cover 2 pivots with respect to the body 1 so as to open at a predetermined angle by rotating the rotating shaft 9 of the sliding bushing 8 about the shaft hole 6 of the mount 4. Then, the cover 2 is supported at the predetermined angle by the supporting rod 14, as shown in FIG. 7. In the above operation, the sliding rod 12 and the sliding bushing 8 are fixed with respect to each other by, for example, a screw 7, and thus the sliding rod 12 will not slide with respect to the sliding bushing 8 all the time. Subsequently, the cover 2 will not slide with respect to the body 1 in the front and back direction.

In another mode, at first, the cover 2 slides with respect to the body 1 by a predetermined distance through sliding the sliding rod 12 with respect to the sliding bushing 8 in an axial direction, so that the top opening 1*b* of the body 1 is partially opened, as shown in FIG. 13. When the sliding rod 12 continues to slide along the sliding bushing 8 to a limiting position, the end of the sliding bushing 8, for example, is stopped by the abutment(s) 13. At this point, due to the weight of a part of the cover that hangs over or protrude outward the body 1, the cover 2 turns automatically backwards about the rotating shaft 9 to a vertical state and the rear portion of the cover 2 abuts against the outer side of the rear wall 1*a* of the body 1 (as shown in FIG. 8). In the above operation, the user need not turn the cover 2 on his/her own initiative.

In yet another mode, at first, the cover 2 slides with respect to the body 1 by a predetermined distance through sliding the sliding rod 12 with respect to the sliding bushing 8 in an axial direction, so that the top opening 1*b* of the body 1 is opened partially, as shown in FIG. 13. Next, the user turns the cover 2, at this point, the sliding rod 12 and the sliding bushing 8 both rotate about the rotating shaft 9, and at the same time, the sliding rod 12 slides backwards and downwards towards the body 1 in the guiding hole 10 of the sliding bushing 8, until the cover 2 turns to the vertical state and the rear portion of the cover 2 abuts against the outer side of the rear wall 1*a* of the body 1 (as shown in FIG. 8).

In a similar way, the operation of closing the cover 2 is performed in a reverse order of the opening operation.

In the above embodiment, a water pipe, an air pipe and an electrical wire can be connected to corresponding parts inside the body 1 through the notch or the through hole so that the water pipe, the air pipe and the electrical wire will not interfere with the operation of closing and opening the cover 2.

Although a few embodiments of the present invention have been shown and described, it would be appreciated by those skilled in the art that modifications may be made in these example embodiments.

For example, the cover of the aquarium can slide along a body of the aquarium and/or rotate with respect to the body of the aquarium so as to open and close a top opening of the body of the aquarium. Also, the cover can open a top opening of a body of the aquarium in a variety of manners. In such ways, the aquarium can be operated simply and can be maintained easily.

In one aspect, an aquarium having a body and a cover or enclosure is provided. A cover of the aquarium can be turned upwards from a normal position. The cover can be moved rearwards from the normal position. Also, the cover can be moved or turned rearwards, then slide downwards in an inclinational way, and finally stand up against an outside of a rear wall of the body. As a result, the top opening of the body is completely opened so that a user can perform operations such as cleaning of the body.

In another aspect, a cover of the aquarium can translationally slide so as to open a top opening of a body of the aquarium. In some implementations, a cover of the aquarium can slide rearwards and downwards in an inclinational way with respect to a body of aquarium so as to open a top opening of the body.

Further, an aquarium can be implemented to include a body having an opening at a top portion of the body. A cover of the aquarium can be implemented to open and close the top opening of the body. Also, a connection device can be designed to connect the cover to the body and enable the cover to slide and/or rotate with respect to the body so as to open and close the top opening of the body. The connection device includes a support component including a vertical fitting part adapted to be mounted to a rear wall of the body and a shaft part disposed at a top end of the vertical fitting part; and a guide rail fixed to an internal top portion of the cover. The shaft part of the support is slidably engaged in the guide rail so that the cover is capable of rotating and sliding with respect to the body.

A slide groove is defined in the guide rail. The slide groove has a cross-section of a substantial T shape and is open downwards. The support component further includes a horizontal fitting part. The horizontal fitting part extends substantially horizontally from the top end of the vertical fitting part and the shaft part is disposed at a position where the horizontal fitting part and the vertical fitting part are connected with each other. A width of an upper portion of the slide groove is greater than a length of the shaft part, and a width of a lower portion of the slide groove is greater than a size of the horizontal and vertical fitting parts in an axial direction of the shaft part and is less than the length of the shaft part, so that the shaft part is adapted to be engaged in the slide groove, and the guide rail can slide on the shaft part.

Furthermore, a bended portion is formed at an end of the horizontal fitting part. The bended portion extends downwards parallel to the vertical fitting part so as to mount the support to an upper edge of the rear wall of the body easily.

In some implementations, two support components and two guide rails can be implemented.

Furthermore, a front edge of the cover is formed in a step shape including an upper step portion and a lower step portion. The upper step portion projects forwards more than the lower step portion so that the upper step portion flushes with a front edge of the body and the lower step portion abuts against an inside of a front wall of the body when the cover closes the top opening of the body.

Also, a stop can be provided at a front end of the guide rail so that the stop may limit a further movement of the shaft part in the guide rail when the cover stands up outside the rear wall of the body. In addition, a turning-engaging member can be disposed at a rear end of the guide rail. A protrusion is formed at the bottom surface of the turning-engaging member. An arc recess can be formed on both lateral sides of the protrusion and a rear side of the protrusion so as to be fitted with the shaft part of the support. The shaft part of the support can be formed with a concave portion to be fitted with the protrusion of the turning-engaging member, and when the shaft part of the support is fitted in the arc recess, the protrusion is fitted in the concave portion so that the cover can pivot around the shaft part with respect to the body.

The aquarium can also include a frame attached to an edge of the top opening of the body. The mounting support is mounted to a rear edge of the frame. A notch or through hole (e.g., a port) is formed in a side portion of the frame so that an inside of the body is in communication with an outside of the body. With the configuration, a water tube, an air tube, and an electrical wire can be connected to corresponding parts inside the body through the notch or through hole so that the water tube, the air tube and the electrical wire will not interfere with the operation of closing and opening.

Alternatively, a supporting rod is disposed at an internal top portion of a side wall of the frame so as to support the cover opened at a predetermined angle. The top opening of the aquarium can be opened in such various manners: the cover moves horizontally with respect to the body so as to open a part of the top opening of the body; the cover firstly moves horizontally with respect to the body, then inclines and slides in an inclinational way with respect to the body, and finally is located against an outside of the rear wall of the body; or the cover firstly be turned upwards and be supported in an opening state of a predetermined angle by the supporting rod.

The cover of the aquarium can be opened simply and in various manners so that a user can select one of the various manners depending upon different operations. For example, the top opening is partially opened by the cover; the top opening is completely opened by the cover; the top opening is opened by sliding the cover translationally with respect to the body; the top opening is opened by turning the cover; the top opening is opened by firstly sliding the cover and then sliding the cover in an inclinational way whiling truing the cover; or the top opening is opened by firstly truing the cover and then sliding the cover in an inclinational way whiling truing the cover.

Therefore, it is convenient to clean the inside of the body, to carry out repairing inside the body, and to throw feed into the body in such a manner that the cover is not necessarily separated from the body. In addition, damage to a connection part can be avoided or reduced when the cover is accidentally closed or turned due to impact to the cover.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is what is described and illustrated, including:

1. An aquarium, comprising:
   a body comprising a rear wall and shaped to form an opening at one end;
   a cover movably disposed over the opening of the body; and
   a connection device to connect the cover to the body and allow the cover to slide over the opening of the body so as to open and close the opening of the body, wherein the connection device comprises:
      a support component comprising:
         a vertical fitting component to mount to the rear wall of the body, and
         a shaft component disposed at one end of the vertical fitting part; and
      a guide rail attached to the cover to slidably receive the shaft component so as to slide and rotate the cover with respect to the body;
   wherein the guide rail is shaped to form a slide groove with a T-shaped cross-section that opens downward and toward the opening of the body;
   wherein the support component further comprises
      a horizontal fitting component that extends horizontally from one end of the vertical fitting component, and
      the shaft component is disposed at a position where the horizontal fitting component and the vertical fitting component are connected with each other; and
   wherein a width of one end of the slide groove is greater than a length of the shaft component, and
      a width of another end of the slide groove is greater than a size of the horizontal and vertical fitting component in an axial direction of the shaft component and is less than the length of the shaft component, so that the shaft component engages the slide groove and the guide rail slides on the shaft component.

2. The aquarium according to claim 1, further comprising a bended portion formed at an end of the horizontal fitting component, and the bended portion is disposed parallel to the vertical fitting part so as to mount the support component to an edge of the rear wall of the body and near the opening of the body.

3. The aquarium according to claim 1, comprising two of the support and two of the guide rail.

4. The aquarium according to claim 1, wherein an edge of the cover is formed in a step-wise shape including an upper step portion and a lower step portion; and
    wherein the upper step portion projects forwards more than the lower step portion so that the upper step portion is flush with an edge of the body and the lower step portion abuts against an inside surface of a front wall of the body when the cover closes the opening of the body.

5. The aquarium according to claim 1, comprising a stop component attached at or near a front end of the guide rail so that the stop component limits movement of the guide rail when the cover hangs from an outside surface of the rear wall of the body in an upright state.

6. The aquarium according to claim 1, wherein a turning-engaging member is disposed at a rear end of the guide rail,
    wherein the turning-engaging member comprises
        a protrusion formed at a bottom surface of the turning-engaging member, and
        an arc recess formed on both lateral sides of the protrusion and a front side of the protrusion so as to be fitted with the shaft component of the support; and
    wherein the shaft component of the support is formed with a concave portion to be fitted with the turning-engaging member; and
        when the shaft component of the support component is fitted in the arc recess, the protrusion is fitted in the concave portion so that the cover can pivot around the shaft component with respect to the body.

7. The aquarium according to claim 1, comprising a frame attached on an edge near the opening of the body, and
    wherein the support component is mounted to a rear edge of the frame, and the frame is shaped to form a port in a side portion of the frame.

8. The aquarium according to claim 7, wherein the frame is shaped to form the port to receive at least one of a pipe and an electrical cable.

9. The aquarium according to claim 7, further comprising a supporting rod disposed at an internal top portion of a side wall of the frame so as to support the cover when opened at a predetermined angle.

10. An aquarium, comprising:
    a body comprising a rear wall and shaped to form an opening at one end;
    a cover movably disposed over the opening of the body; and
    a connection device to connect the cover to the body and allow the cover to slide over the opening of the body so as to open and close the opening of the body, wherein the connection device comprises:
        a support component comprising:
            a vertical fitting component to mount to the rear wall of the body, and
            a shaft component disposed at one end of the vertical fitting part; and
        a guide rail attached to the cover to slidably receive the shaft component so as to slide and rotate the cover with respect to the body;
    wherein a turning-engaging member is disposed at a rear end of the guide rail;
    wherein the turning-engaging member comprises
        a protrusion formed at a bottom surface of the turning-engaging member, and
        an arc recess formed on both lateral sides of the protrusion and a front side of the protrusion so as to be fitted with the shaft component of the support; and
    wherein the shaft component of the support is formed with a concave portion to be fitted with the turning-engaging member; and
        when the shaft component of the support component is fitted in the arc recess, the protrusion is fitted in the concave portion so that the cover can pivot around the shaft component with respect to the body.

11. The aquarium according to claim 10, comprising a frame attached on an edge near the opening of the body, and
    wherein the support component is mounted to a rear edge of the frame, and the frame is shaped to form a port in a side portion of the frame.

12. The aquarium according to claim 11, wherein the frame is shaped to form the port to receive at least one of a pipe and an electrical cable.

13. The aquarium according to claim 11, further comprising a supporting rod disposed at an internal top portion of a side wall of the frame so as to support the cover when opened at a predetermined angle.

* * * * *